United States Patent [19]

Lanfranconi et al.

[11] Patent Number: 4,498,812

[45] Date of Patent: Feb. 12, 1985

[54] PROCESS FOR LAYING A SUBMARINE CABLE

[75] Inventors: Gianmario Lanfranconi; Giuseppe Monti, both of Milan, Italy

[73] Assignee: Societa' Cavi Pirelli S.p.A., Milan, Italy

[21] Appl. No.: 468,501

[22] Filed: Feb. 22, 1983

[30] Foreign Application Priority Data

Feb. 22, 1982 [IT] Italy .................. 19785 A/82

[51] Int. Cl.³ ............................ F16L 1/00
[52] U.S. Cl. ........................... 405/168; 405/157; 405/158
[58] Field of Search .............. 405/158, 161, 162, 163, 405/168-171, 157; 254/134.35 C

[56] References Cited

U.S. PATENT DOCUMENTS 3,136,133  6/1964  Perret ................. 405/170
3,466,881  9/1969  Lamy .................. 405/171 X
3,699,692 10/1972  Smith ................. 405/169
4,164,379  8/1979  Denman ............... 405/158

FOREIGN PATENT DOCUMENTS 6615912  5/1967  Netherlands .......... 405/158

Primary Examiner—Dennis L. Taylor
Attorney, Agent, or Firm—Brooks, Haidt, Haffner & Delahunty

[57] ABSTRACT

An underwater electric power cable which has a minimum radius of curvature to which it can be bent without damage and which can be suspended between underwater suspension points in no greater than a predetermined length for a desired service life is layed by first laying a flexible steel rope along the desired underwater course and adjusting the rope position and length so that there are no curvatures thereof less than the minimum radius and no lengths thereof greater than the predetermined length, and then, the cable is layed alongside the rope so as to follow the configuration of the rope.

9 Claims, 4 Drawing Figures

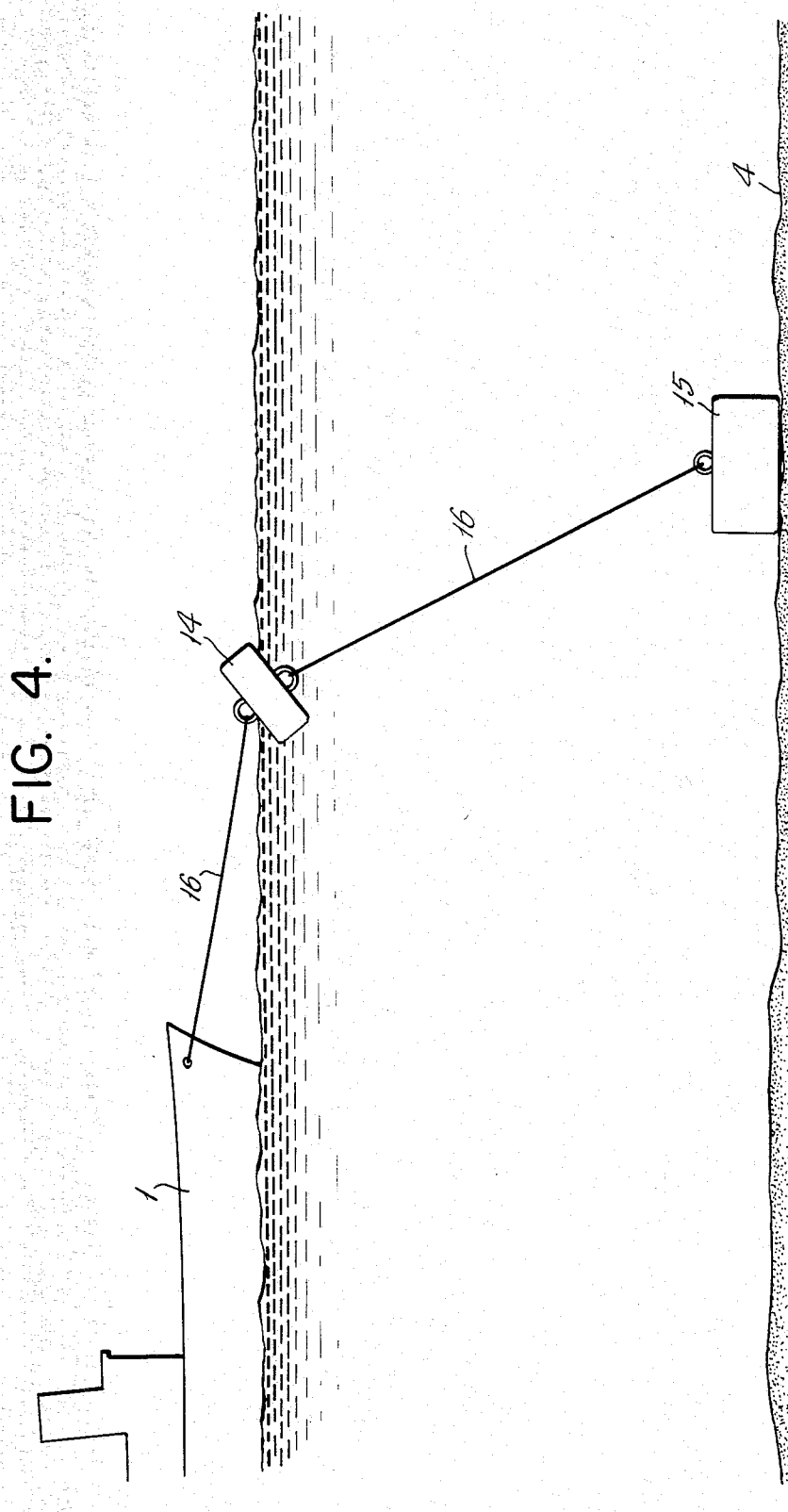

PROCESS FOR LAYING A SUBMARINE CABLE

The present invention relates to a process for the laying of an electric submarine cable and, more particularly, to the laying of a cable along a tract of the sea bottom that is rough and uneven, for example, having rocks thereon, or having projecting parts or other bumps.

Various "known processes" exist, for the laying of an electric cable, and such processes are generally carried out by utilizing a floating ship provided with a storage system for the cable, at least one pay-out pulley for allowing the cable to run out from the ship towards the bottom of the sea and suitable unwinding means.

In addition, the laying down of the cable is effectuated by following a pre-fixed route between the starting and terminal points, and such route is graphically defined in a diagram by a series of straight lines, inclined one with respect to the other and forming, together, a continuous polygonal configuration. In practice, the cable moves away from its theoretical course, and becomes disposed with an undulated configuration along this polygonal line.

In the instance wherein it is necessary to lay-down several cables, along the same route, there are marked out just as many parallel-to-each-other routes as there are cables to be layed-down while, for precautionary reasons, maintaining a distance in-between the various routes which is equal to the depth from the water surface to the sea bottom for the purpose of preventing any interference or overlying of one cable with respect to the next.

Unfortunately, the theoretical straight line foreseen for laying a cable, which is established on the assumption that the sea bottom is flat, substantially, proves, in practice, to be unsatisfactory because of the presence of the various rough, uneven areas at the sea bottom which are not easily noticeable or predictable, in a complete manner, when using the present day systems for underwater surveys.

In the situation faced, the cable payed-out from the ship's capstan, when following the linear route, would be layed-down on the sea bottom by following the curvature imposed on it by the rocks and other roughness at the bottom, and it would, moreover, remain suspended in certain portions of its length, for example, between the jutting-out ridges upon which it is made to rest, and the succeeding area at the sea bottom upon which it rests horizontally.

In this instance, the cable could assume unacceptable deformations for allowing a correct functioning of the dielectric.

In particular, corresponding to irregularities in the sea bottom, the cable becomes layed with a rather small radius of curvature with resulting intolerable mechanical, tractional and compressional stresses.

Generally speaking, it is possible to foresee the adverse origination (on the various cable layers) of accentuated dents or localized impression marks, or also, of displacements in-between the various cable components.

Certain portions of cable could, moreover, be suspended for too excessive a length, with the result that it is subjected to strong oscillating motions, such as those caused by the underwater currents existing at the sea bottom and by the reversal of the cycles of the currents which cause a reduction in the service-life of the cable itself because it is exposed to unacceptable values of fatigue stress.

Unfortunately, to date, no satisfactory solutions have been found for overcoming these described drawbacks.

In fact, a search for the possibility of having alternative routes for the cable, in such way as to avoid any unnevenness present at the sea bottom, can be proved in vain, due to the necessity of having to then pass the cable through a particular hollow or dip present in the tract of sea bottom which is nearest to the shore landing.

The other solution of levelling the sea bottom, by making use of blasting, would, of course, be in contrast with the desire to prevent the disturbance of natural conditions, and hence, can be regarded as being impracticable.

The problem is, moreover, rendered even more complicated, because of the fact of having to lay-down several cables in one uneven tract which has spikes of jagged rocks etc. and in conditions where the width of the tract itself is less than the depth itself as usually occurs in the vicinity of the coastline. It can hence be understood how under these above conditions, it is no longer possible to maintain the rule of keeping a safe laying-distance between the cables at the sea bottom where they are to be laid, such safe distance preventing any intolerable interference between the various cables at the time of laying down the cables.

It is, therefore, one object of the present invention to provide a process for laying-down a submarine cable which overcomes the drawbacks described hereinbefore.

The principal object of the present invention is a process for laying down a submarine cable along a seabed having a rough surface, in the form of jutting rocks or spikes and other unevenness in general, said process being characterized by the fact of comprising the phases of:- (a) Placing down an elongated, flexible element along the course to be followed by the cable; (b) Comparing the predetermined values of the minimum curvature radius permitted for the cable with the curvature radius of said elongated element when it is disposed over and around each of said jutting-out parts at the sea bottom; (c) Comparing the predetermined value of the maximum length permissible for the cable, between two suspension points, with the length of the elongated element which is between the suspension point on each one of said jutting parts and another resting point; (d) Varying the disposition of the elongated element until, along the entire course at the sea bottom, the radius of curvature of the elongated, flexible element becomes equal to, or greater than the value of the minimum radius of curvature permissible for the cable, and varying the length of the elongated element until its length is less than, or at least equal to, the value of the maximum length permissible for the cable between two points of suspension; (e) Laying the cable along said course at the sea bottom by accurately following the course of the elongated, flexible element which was previously laid.

The fundamental aspect of the invention resides, hence, in laying down an elongated, flexible element, at the bottom of a particularly uneven sea floor, in such a way as to be able to examine how and where it rests upon the various spikes of jutting rocks, and in this manner to be then able to judge whether the same plotted course of the thus layed-down element, can also be followed by the cable itself without prejudicing the integrity of the insulation and the conductive elements of the cable.

As can be comprehended, this involves an unusual procedure since, according to the principle of the invention, recourse is had to putting into effect the phases of first laying an element which laying down does not, in itself, accomplish the ultimate objective of laying the cable.

Practically speaking, and contrary to what might be expected, recourse is not had here to the measurement of the height or dimensions of the jutting-out rocks etc. at the bottom by means of instruments which are available aboard the ship, or by means of observation, and the measurements obtained by the use of submarine means, of said dimensions. Instead, the effects of the floor unevenness upon the flexible element, i.e. the deformed configuration of the latter element, are verified. Thereafter, the rearranging of the profile of the disposition of said flexible element is carried out until such time as it is felt certain that the most suitable profile for the successive laying of the cable itself has been determined.

The advantage of this process is quite evident since the cable could not be subjected to any variations in its laying configuration after it has undergone a bending deformation around a jutting rock. If it were so bent and if the resulting radius of curvature of the cable were too small, and below a certain limit, the integrity of the dielectric and the desired disposition of the conductors, would already be compromised, and the shifting of the cable away from a particular jutting-out rock would neither modify, nor minimize for certain, the damage suffered.

The invention will be better comprehended from the following detailed description, given solely by way of example, which should be considered in conjunction with the accompanying drawings in which:

FIG. 4 is a schematic, elevation view illustrating a portion of the means for anchoring the ship.

Figure 1:
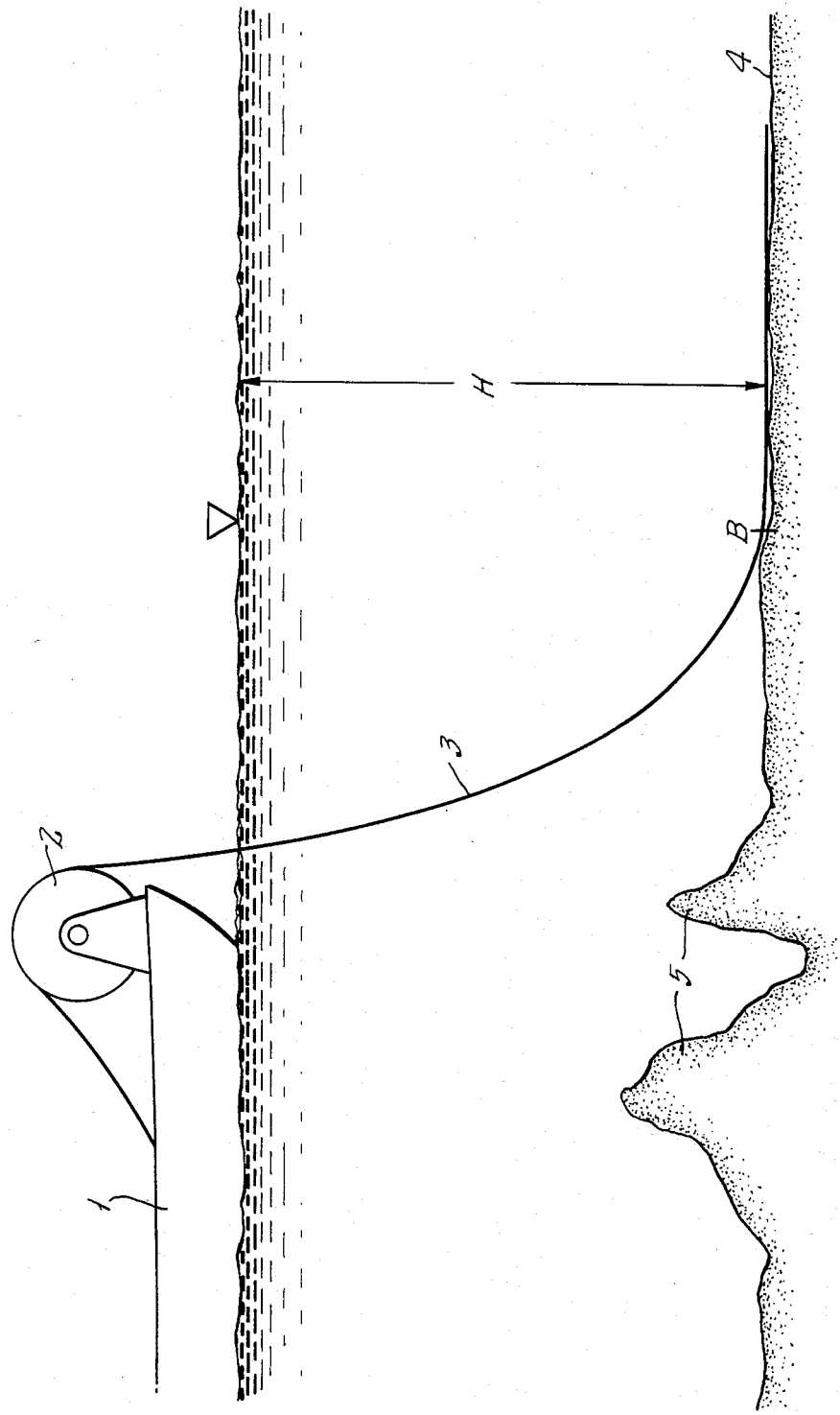
FIG. 1 is a schematic, elevation view illustrating the laying down of an elongated, flexible element, the element being payed-out from a ship.

The invention relates to the laying-down of a submarine, electric power cable, along a course at the bottom of a water-way. Said bottom is uneven because of projections, such as, for example, rocks or jutting-out spikes having various heights, having dimensions of about 1 meter and having various forms, for example, pointed, pyramid-like, and having a more or less irregular aspect or being curvilinear in shape.

The cable can have an external diameter of any desired nominal value, for example, of 60 mm or of 150 mm, and for cables of such diameters, it has been found (in the testing laboratory) that the permissible minimum radii of curvature are, respectively, of 1.5 meters and 3 meters.

The bending condition to which the cable can be subjected, when going around a rock spike, is, therefore, determined prior to the laying down of the cable underwater. Such bending must be without any risk of compression and traction stresses which would cause unacceptable damage which could impede the correct functioning of the cable during its use to transmit electric power.

Preferably, in the testing laboratory, the value of the maximum length admissible for the cable's looping, when it is suspended between two points, is also determined. That is, tests are made to determine the value of free length which is not to be exceeded, when a cable is layed-down thereby to prevent great amplitudes in the oscillations of the cable with consequent intolerable fatigue stresses which could damage the integrity of the resistant structure of the cable.

The determining of the value of the maximum permissible length is not a simple matter because the phenomena at play are various. However, one can accept, as being within a good approximation, the fact that these values depend upon the number of years of cable life, i.e., the length of time for which a correct and efficient functioning of the cable is desired, upon the intensity of the underwater currents that are directed transversely to the cable, upon the number of underwater current direction reversals per day and upon the pull applied to the cable at the sea bottom. As to the latter, the more a cable is stretched, the more resistant to movement it will become.

To give a concrete example, a value of seven meters can be assumed as being critical for a cable length suspended inbetween one jutting-out rock and another resting point. Below and above this critical value, the cable has, respectively, an acceptable laying configuration of a non-acceptable laying configuration.

The invention is based upon the concept of disposing on the sea bottom or water bottom, even before the laying of the cable, an elongated, flexible element having a weight per linear meter in water of at least, for example, 10 times less than the weight per linear meter in water of the cable itself that must be layed. Preferably, said elongated, flexible element is a metallic wire-rope, for example, a steel rope. Said rope also comprises appropriate means for allowing the position thereof to be distinguished when it is lying at the bottom of the water.

Understandably, said last-mentioned means can consist of any desired type of means, such as those which are detectable by electro-magnetic instruments and through electro-magnetic waves and which are suitable for ascertaining the profile of the layed rope. However, preferably, such means are of the type that will be visibly distinguishable. For this latter purpose, the rope is clad in a plastic or elastomeric sheath that can clearly be seen when lying on the water bottom, for example, a yellow-colored polyvinylchloride material.

Moreover, in a preferred embodiment, it is envisioned to provide (with a uniform predetermined distribution) around said plastic or elastomeric layer or sheath of the wire-rope, a plurality of reference means, for example, a plurality of colored markings, having a color different from that of the underlying layer, or markings, black in color, placed in succession one behind the other with a distance of 2 or 3 meters between two adjacent markings. The observation of these various markings will permit, advantageously and in a simple manner, one to ascertain visibly the length of the rope under the water.

According to this invention, it is envisioned that the rope and the cable will be layed-down by means of a ship 1 (FIG. 1), of a known type, which comprises a paying-out pulley 2 and a suitable pulling means (not shown).

In FIG. 1, there is shown the laying down, at the bottom of the water, of a rope 3, which in being payed-out (as the ship 1 moves forward) from pulley 2 and which slowly descends towards the sea bottom 4 where said rope settles at depth H below the surface of the water. Such depth may, for example, be between 200 and 300 meters.

The bottom 4 is shown, schematically, as having a plurality of rock spikes 5. The paying-out of the rope 3 is carried out from the ship 1, with a tension taking into account the effect of the weight per linear meter of the rope in water multiplied by the depth H and the horizontal pull at the bottom that is actually desired on the portion B of the rope 3, while gradually advancing it for the purpose of preventing any tangles and knots from forming in the rope itself during the operation of placing it down on the sea-bed.

Figure 2:
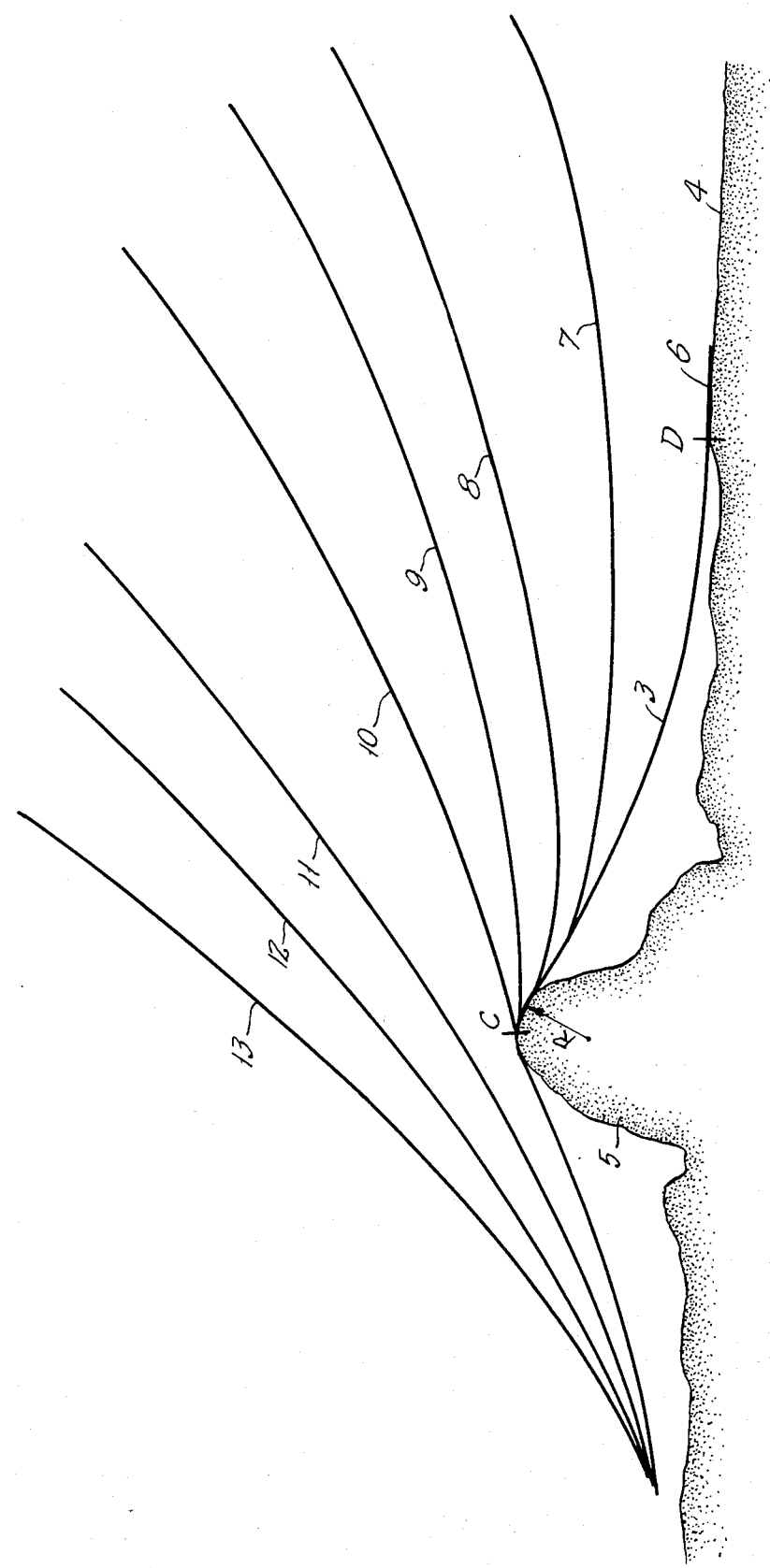
FIG. 2 is similar to FIG. 1 and illustrates various configurations which the flexible element may assume with maneuvering of the ship.

In FIG. 2, there is shown, schematically, the rope 3 disposed on the top of a rock spike 5, with a curvature radius R and a free suspension length C-D. The extremities of the length of the suspended rope 3, are respectively one, placed upon the top of the rock-spike 5, and the other, placed upon the horizontal plane at the sea bottom 4.

Under the conditions shown in FIG. 2, and through the means of a telecamera maneuvered from inside an appropriate submarine, the lay-out configuration of the rope can be observed, and a comparison is then made of the curvature radius R, and the length C-D, with the corresponding, already predetermined, permissible values for the cable.

Should the case arise of the rope 3 being disposed with a radius of curvature less than the radius tolerable for the cable, or with a suspension length C-D that is greater than that permissible for a cable, then the ship is made to move forward or backward, so as to gradually raise the rope 3 from the position corresponding the configuration 6 until it is caused to assume positions corresponding to configurations 7–13, etc.

Successively, by means of maneuvering the ship 1, a further disposition of another length of the rope 3 is carried out with the engagement of the rope 3 with a further rock-spike, whereby there is verified the acceptability of the relative geometry of the rope 3 upon the sea bottom, i.e. the radius of curvature and the maximum length of suspension compatible with the corresponding predetermined values for the cable.

The phases for the determination of the laying-out of the cable (as just explained above) are gradually repeated in correspondence to each spike or rock or other uneven features of the entire tract of the sea bottom until nearing the point of arrival upon land.

In the phases that follow, the laying-down of the cable is carried out along the very same path marked out previously by the rope 3.

The cable is gradually payed-out from the conventional coil existing on the ship 1 which is made to slowly advance forward over the entire waterway overlying the bottom, from the starting point of placing the rope down, to the termination point.

The situation relative to this phase is shown in FIG. 1, by assuming, for simplicity's sake, a cable in substitution of rope 3.

During this phase, the means for paying-out the cable are used in such a way as to maintain the ratio between the pull at the bottom applied at B to the cable that is being layed upon the sea bottom and the weight per linear meter of the cable in water, equal to the ratio between the same parameters referred to for placing down the rope 3.

In fact, it has been found that with such ratio, the essential condition for laying the cable upon each rock-spike is obtained, namely, the length of the suspended part equal to that of the rope suspended upon the same spike has a length C-D (FIG. 2) equal to, or less than, the maximum value permissible for a predetermined and desired cable service life.

In practice, if care is taken when laying-down the rope 3, with having the pull at the sea bottom predetermined in such a way that the pull at the bottom, with which the rope has been layed, and the pull at the bottom, with which the cable will be layed, are in direct ratio to the weight, in water, of the rope 3 and the cable itself, then, it will result that the catenaries formed at the rough, uneven sea bottom, during the laying down of the rope, will be practically equal to those formed during the laying of the cable itself. Consequently, by looking at the rope 3 that is already layed down, one can certain, *a priori*, what the catenaries actually will be in the cable, if the latter is also layed exactly in correspondence to the previously layed rope 3.

As far as the pull at the bottom and the maintaining of the cited direct ratio between pull and weight are concerned, the pull at the sea bottom To is related to the pull T exercised on the ship itself, according to the following correlation:

$$T = p \cdot H + T_o$$

where p is the weight in water, of the element that is being layed, and H is the laying depth.

Since the pull T on the ship is easily controllable, it results that even To is also easily controllable so as to obtain equal catenaries for the rope 3 and for the cable, as was previously explained.

The process is moreover facilitated owing to the fact that, similarly to what is done in the instance of the rope 3, the cable laying operations also take place with the aid of an underwater telecamera which is maneuvered in the vicinity of the sea bottom for thus being able to indicate the position of the rope 3, and consequently, to guide the ship in an appropriate manner for laying the cable in the course already marked out by the rope 3.

The process of this invention is favorably applicable for laying several cables along courses at the bottom of a waterway which is particularly uneven and bumpy, without having any possibility of interference occurring between one cable and the one next to it.

In fact, the preliminary laying-down of several ropes, of a number equal to the number of the cables required, combined with the possibility of varying and modifying the configuration of the ropes, allows for determining a safe distance in-between the rope configurations, thereby, preventing any risk of interference between the cables layed successively to said ropes, according to the profiles established by these ropes themselves.

Figure 3:
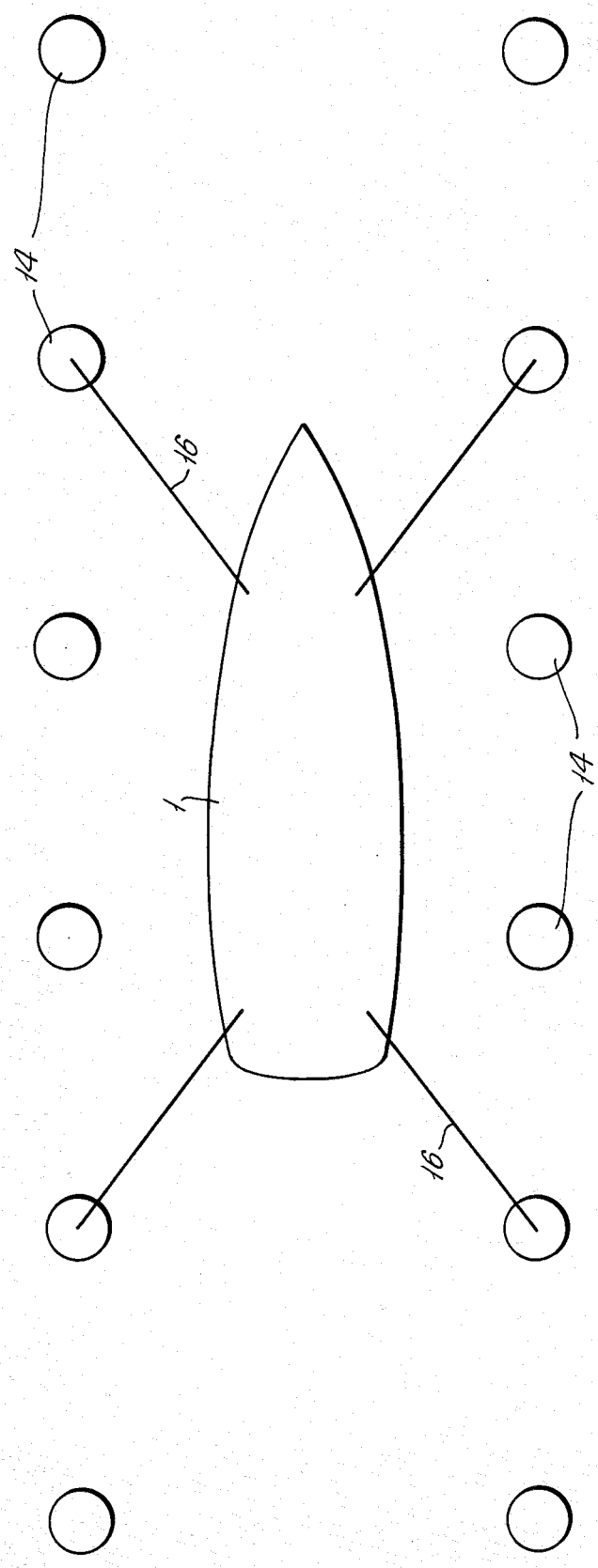
FIG. 3 is a schematic, plan view illustrating the anchoring of the ship during the laying of the cable.

Preferably, the process of the invention is carried out by guiding the ship in-between the two lines of positioning and anchoring points 14 (FIG. 3), in such a manner as to cause slow forward advancings of the ship with suitable inclinations on the route. The positioning of the ship is carried out through a linking of the ship to said positioning points, in as many different ways as are possible.

In particular, it is envisioned that the ship will be caused to advance in-between two lines of buoys 14 anchored at the bottom, preferably with cement structures as anchoring means 15 (FIG. 4), said buoys 14 being positioned at the sides of the laying course at the bottom of the waterway.

In this manner, the ship 1 can be anchored in its turn by suitable steel ropes or chains 16 (FIGS. 3 and 4) to two cement structures positioned in front and to two cement structures positioned at the back.

In this instance, the inclination of the ship 1 with respect to the direction of advancement, are obtained through appropriately varying, by appropriate winches, the length of the chains 16 which connect the ship 1 with the cement structures 15 placed at the bottom. The advancing of the ship is moreover obtained by varying, in a prefixed order, the pairs of cement structures 15 (front and back) to which the ship 1 is connected.

The described anchoring system has the advantage of maintaining the ship 1 in a stable position even in the face of heavy seas and strong underwater currents. Hence, the environmental conditions to not negatively effect the correct positioning of the cable.

Further still, the anchoring system described offers, to advantage, the possibility of causing the ship to proceed slowly. Consequently, there is available all the time necessary for the telecamera to control that the operation of laying the cable or cables so that the laying thereof takes place as close as possible to the guiding rope or ropes 3.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A process for laying an electric cable along an underwater course at the bottom of the water, said cable having a minimum radius of curvature below which it cannot be bent without damage and permitting a maximum distance between underwater points of suspension for a desired service life and said bottom being uneven by reason of first portions thereof which project above second, other portions thereof, said process comprising:
    laying an elongated, flexible element different from said cable along said course;
    adjusting the position of said element so that the radius of curvature thereof at any of said first projections encountered by said element is at least equal to said minimum radius of curvature of said cable;
    adjusting the length of said element between underwater points of suspension thereof so that said length thereof is no greater than said maximum distance; and
    laying said cable alongside said element so that it follows the configuration of said element as adjusted.

2. A process as set forth in claim 1 wherein said elongated, flexible element is a steel rope.

3. A process as set forth in claim 1 or 2 wherein said elongated, flexible element has a weight per linear meter in water which is at least ten times smaller than the weight per linear meter in water of said cable.

4. A process as set forth in claim 1 or 2 wherein a layer of a material having a color which is visible when the elongated, flexible element is at said bottom is applied to the surface of said elongated, flexible element.

5. A process as set forth in claim 4 wherein reference devices are applied to said elongated, flexible element in a predetermined spacing whereby the length thereof from a predetermined portion thereof may be determined.

6. A process as set forth in claim 1 wherein horizontal pulling forces are applied to said elongated, flexible element during the laying thereof.

7. A process as set forth in claim 6 wherein horizontal pulling forces are applied to said cable during the laying thereof and wherein the ratio between said horizontal pulling forces applied to said cable to the weight per linear meter in water of said cable is substantially the same as the ratio of horizontal pulling forces applied to said elongated, flexible element to the weight of said elongated, flexible element per linear meter in water.

8. A process as set forth in claim 1 wherein the course of said elongated, flexible element is marked by anchoring devices at said bottom during the laying thereof, wherein said cable is layed from a ship on the surface of said water and wherein said ship is positioned by securing it to said anchoring devices.

9. A process as set forth in claim 8 wherein said anchoring devices are disposed in pairs ahead of and behind said ship as it is moved along said course, one of each pair being at one side of the ship and the other of each pair being at the other side of said ship, and wherein floating buoys are secured to said anchoring devices.

* * * * *